(12) United States Patent
Gil Mollà et al.

(10) Patent No.: US 9,909,561 B2
(45) Date of Patent: Mar. 6, 2018

(54) ROTOR ASSEMBLY FOR A WIND TURBINE AND METHOD FOR MOUNTING A BLADE TO THE ROTOR ASSEMBLY

(71) Applicant: ALSTOM RENEWABLE TECHNOLOGIES, Grenoble (FR)

(72) Inventors: Isaac Gil Mollà, Barcelona (ES); Ricardo Lázaro, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 349 days.

(21) Appl. No.: 14/409,454

(22) PCT Filed: Jun. 21, 2013

(86) PCT No.: PCT/EP2013/063013
§ 371 (c)(1),
(2) Date: Dec. 18, 2014

(87) PCT Pub. No.: WO2013/190099
PCT Pub. Date: Dec. 27, 2013

(65) Prior Publication Data
US 2015/0167632 A1    Jun. 18, 2015

Related U.S. Application Data

(60) Provisional application No. 61/691,962, filed on Aug. 22, 2012.

(30) Foreign Application Priority Data

Jun. 22, 2012  (EP) ..................................... 12382247

(51) Int. Cl.
F03D 1/06        (2006.01)
F03D 13/10       (2016.01)
F03D 80/50       (2016.01)

(52) U.S. Cl.
CPC ........... *F03D 1/0658* (2013.01); *F03D 1/065* (2013.01); *F03D 13/10* (2016.05); *F03D 80/50* (2016.05);
(Continued)

(58) Field of Classification Search
CPC ......... F03D 1/0658; F03D 1/001; F03D 1/003
See application file for complete search history.

(56) References Cited

U.S. PATENT DOCUMENTS 9,068,555 B2 *  6/2015  Arocena De La Rua ........................... B66C 1/62
2007/0253819 A1  11/2007  Doorenspleet et al.
(Continued)

FOREIGN PATENT DOCUMENTS

DE  10 2006 041383    3/2008
DK  WO 2011095167 A2 *  8/2011 ............. B66C 1/108
(Continued)

*Primary Examiner* — Richard Edgar
(74) *Attorney, Agent, or Firm* — Dority & Manning, P.A.

(57) ABSTRACT

A rotor assembly for a wind turbine comprises a hub, a blade provided with a blade root portion and a strengthener for the blade root portion. The strengthener comprises a supporting part that strengthens the blade root portion and the supporting part comprises a supporting portion to temporarily support the blade. The supporting portion is made in one piece with the supporting part. The rotor assembly also comprises a number of first fasteners and second fasteners to fasten the blade root portion to the hub. The second fasteners are adapted to fasten the supporting part of the strengthener to the blade root portion when the latter is not fastened to the hub.

13 Claims, 10 Drawing Sheets

(52) U.S. Cl.
    CPC ..... *F05B 2230/61* (2013.01); *F05B 2240/916* (2013.01); *Y02E 10/721* (2013.01); *Y02E 10/728* (2013.01); *Y02P 70/523* (2015.11); *Y10T 29/49316* (2015.01); *Y10T 29/49318* (2015.01)

(56) References Cited

U.S. PATENT DOCUMENTS

| | | |
|---|---|---|
| 2010/0028152 A1 | 2/2010 | Numajiri et al. |
| 2010/0139062 A1 | 6/2010 | Reed et al. |
| 2010/0254813 A1 | 10/2010 | Dawson et al. |
| 2011/0044817 A1 | 2/2011 | Bendel et al. |
| 2011/0142618 A1* | 6/2011 | Moore .................. F03D 1/0658 415/229 |
| 2012/0328443 A1* | 12/2012 | Yegro Segovia ..... F03D 1/0658 416/205 |

FOREIGN PATENT DOCUMENTS

| | | | | |
|---|---|---|---|---|
| ES | WO 2011086205 A1 * | 7/2011 | ............... | B66C 1/62 |
| WO | WO 2011/064659 | 6/2011 | | |

* cited by examiner

ROTOR ASSEMBLY FOR A WIND TURBINE AND METHOD FOR MOUNTING A BLADE TO THE ROTOR ASSEMBLY

This application claims the benefit of European Patent Application No. 12382247.0 filed on Jun. 22, 2012, and U.S. Provisional Patent Application Ser. No. U.S. 61/691,962 filed on Aug. 22, 2012.

The present invention is related to a rotor assembly for a wind turbine, comprising a blade provided with a blade root portion, and a strengthener for the blade root portion. The invention is also related to a method for dismounting a blade from the rotor assembly.

BACKGROUND

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft drives the generator rotor ("directly driven") either directly or through the use of a gearbox.

Wind turbines generally comprise a tower upon which a nacelle is mounted. A rotor comprising a hub and a plurality of blades may be rotatably mounted in said nacelle. When erecting a wind turbine, generally the tower is constructed first. Then the nacelle may be mounted on top of the wind turbine and, subsequently, the hub and blades may be hoisted towards the top of the tower and mounted in the nacelle. It is known to hoist a complete rotor assembly (a hub comprising all blades) and installing it on the nacelle. However, it is also known to hoist an incomplete rotor (only a hub, or a hub comprising a selection of the blades) and installing it. Subsequently, the remaining blades can be hoisted one by one from a ground level towards the rotor hub. Alternatively, it is known to hoist the nacelle together with the hub, and subsequently hoist the blades, one after another.

A clear trend in the field of wind turbines has been to increase the size of the turbines. With the goal of converting more energy and producing more electricity, towers have become higher and blades have become longer. In order to hoist a blade from a ground level towards the hub it is known to use two large cranes. For example, the blade may be horizontally hoisted by holding it at two regions thereof using two cranes. However, the use of such large cranes can be very expensive.

A further trend in the field of wind turbines is to place them offshore. The use of boats carrying large cranes may be even more expensive than using cranes on land.

It is known to avoid using more than one crane to hoist a blade up to a hub or down therefrom by providing pulleys on the hub. US2010139062 discloses a lifting arrangement for vertically lowering and raising a single rotor blade of a wind turbine. Lifting fixtures are symmetrically installed on a hub surface about the rotor blade being replaced. Lifting wires from coordinated ground winches pass over the lifting fixtures to support the blade and attach to a blade harness. The blade harness attaches over a substantial length of the rotor blade, distributing the blade weight broadly. A tail pick crane facilitates transfer of the rotor blade between a vertical and a horizontal position. But with this arrangement the blade has to be handled by means of a harness, which requires great care in order not to damage the blade, because the maximum pressure that can be applied to the blade surface without spoiling it is rather low.

SUMMARY

The present disclosure teaches ways of mounting a blade to the rotor assembly of a wind turbine, and of dismounting the blade therefrom, that at least partially solve the problems mentioned above.

In a first aspect, the present disclosure contemplates that the rotor assembly comprises a blade provided with a blade root portion, and a strengthener for the blade root portion, the strengthener comprising a supporting part that strengthens the blade root portion, said supporting part comprising a supporting portion to temporarily support the blade, and said supporting portion being one piece with the supporting part. In other words, the supporting portion is a means to anchor the blade to a hoisting means through the supporting part, the latter being strong enough to support the weight of the blade.

In this way, the blade can be hoisted through the supporting portion and no harness is needed. The fact that the supporting portion is made in one piece with the supporting part simplifies the blade mounting or dismounting operations, because otherwise the supporting portion would need to be mounted to the supporting part, adding a task to the mounting o dismounting procedure.

In some embodiments, the rotor assembly may comprise a hub and a number of first fasteners and second fasteners to fasten the blade root portion to the hub, said second fasteners being adapted to fasten the supporting part of the strengthener to the blade root portion when the latter is not fastened to the hub, whereby the blade can be temporarily supported through the second fasteners and the supporting part when the blade is being mounted to the rotor assembly or dismounted therefrom.

Optionally, the second fasteners may be bolts provided with an indentation at their central region, the rotor assembly then comprising a plurality of holders that correspond to said indentations and can cooperate therewith to fasten the supporting part of the strengthener to the blade root portion.

Additionally or alternatively, the second fasteners may be bolts provided with a screw thread at their central region, the rotor assembly comprising a plurality of nuts that correspond to said screw threads and can cooperate therewith to fasten the supporting part of the strengthener to the blade root portion.

The supporting part of the strengthener may be a mounting flange for attachment to the blade root portion. Said flange is intended to rigidize the blade root portion. In some embodiments, the strengthener may further comprise a mounting ring for arrangement between the mounting flange and the hub, said ring comprising a plurality of recesses to house the plurality of nuts or holders. Such a ring is intended as a help when mounting or dismounting the blade.

Alternatively, the supporting part of the strengthener may be the mounting ring. As before, the ring may comprise a plurality of cavities or recesses to house the plurality of holders or nuts.

In some embodiments, said recesses may be radial recesses opened to the inside of the ring, so that the nuts or holders can be operated from inside the hub.

The hub may comprise a bearing for the blade, said bearing comprising a plurality of cavities to house said plurality of holders or nuts. In some embodiments said cavities may be through holes, whereby said holders or nuts can be extracted along the through hole to, for instance, allow the second fasteners to be subsequently replaced by first fasteners.

In a second aspect, the present disclosure contemplates performing a method for mounting a blade to such a rotor assembly, comprising the steps of:
fastening the supporting part of the strengthener to the blade root portion by means of the second fasteners;
attaching the supporting part to a hoisting means;
hoisting up the blade through the supporting part;
fastening the blade root portion to the hub by means of the first fasteners.

Optionally, the method may comprise the step of further fastening the blade root portion to the hub by means of the second fasteners. The nut or holder may be sufficiently fixed to the second fastener to prevent its movement when the rotor assembly is mounted and functioning.

Additionally or alternatively, the method may comprise the steps of replacing some or all the second fasteners with first fasteners and further fastening the blade root portion to the hub with these first fasteners.

In a third aspect, the present disclosure contemplates performing a method for dismounting a blade from the rotor assembly, comprising the steps of:
attaching the supporting part of the strengthener to a hoisting means;
partially unfastening the blade root portion from the hub by removing the first fasteners but keeping the second fasteners;
hoisting down the blade through the supporting part.

In case there are no, or there are too few, second fasteners fastening the blade root portion to the hub, the dismounting method may further comprise the step of replacing some first fasteners with second fasteners. The blade can then be hoisted through the second fasteners and the supporting part.

BRIEF DESCRIPTION OF THE DRAWINGS

Some particular embodiments of the present invention will be described in the following, only by way of non-limiting example, with reference to the appended drawings, in which.

DESCRIPTION OF PARTICULAR EMBODIMENTS

With reference to FIGS. 1 to 4, a wind turbine comprises a hub 20 and some blades 10 that are attached, or to be attached, to the hub. The hub 20 comprises a bearing 25 for the blade 10. The bearing 25 comprises a rotary race 26, a stationary race 27, and one or more tracks 28 defined between said two races for housing some balls (not shown). The stationary race 27 is attached to the body of the hub 20 and the rotary race 26 is intended to be attached to the blade 10. This arrangement allows the blade 10 to rotate on its axis and is useful for pitch control. The stationary race 27 may be attached to the body of the hub 20 by means of some bolts (not shown) that can be fastened to corresponding inserts 22 provided in the hub.

A blade 10 for a wind turbine comprises a root portion 11, which is the part of the blade that is attached to the hub 20. The blade root portion 11 comprises a plurality of inserts 12 to which corresponding bolts 50 (see FIGS. 3 and 4) or 51 can be fastened. The bolts 50 or 51 may be stud bolts that are fastened to the rotary race 26 of the bearing 25 by means of corresponding nuts 58.

Figure 1:
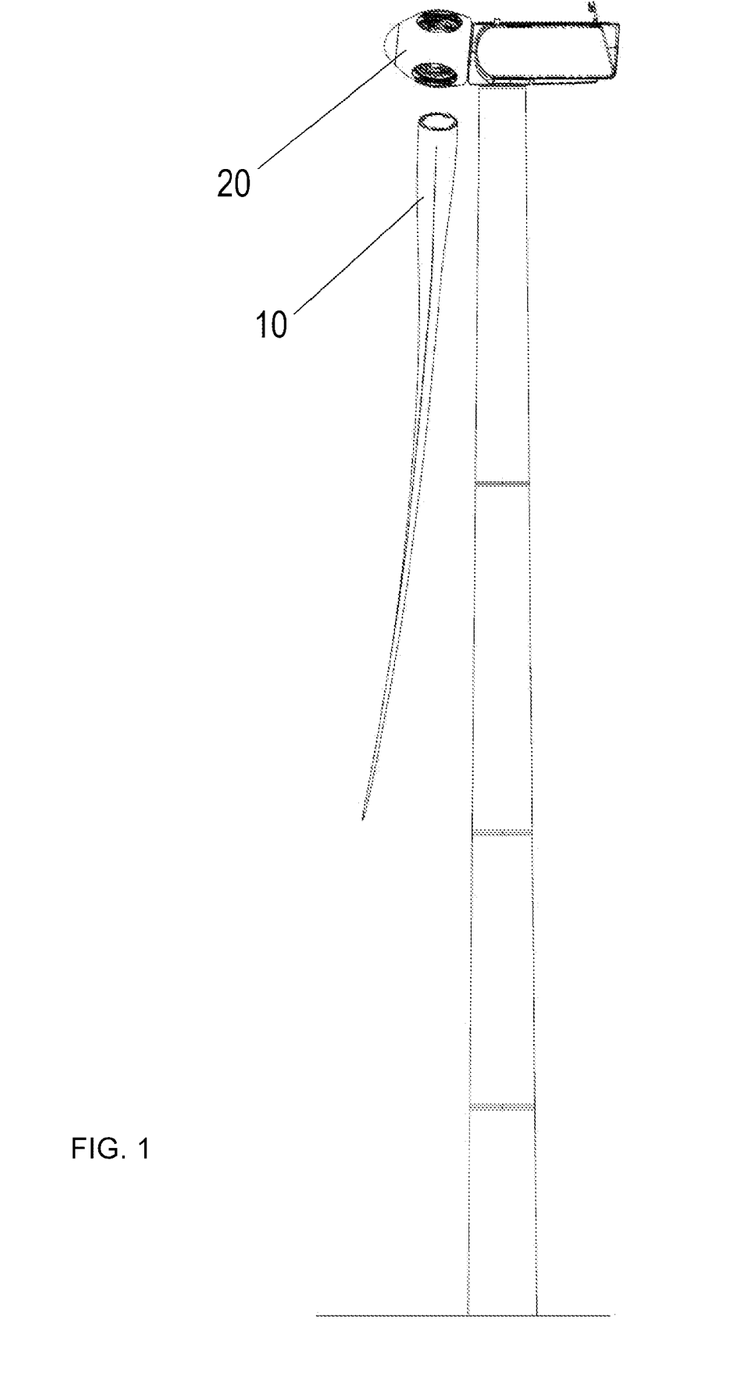
FIG. 1 is a partially exploded view of a wind turbine in which there is a blade that is separated from the hub.
Figure 2:
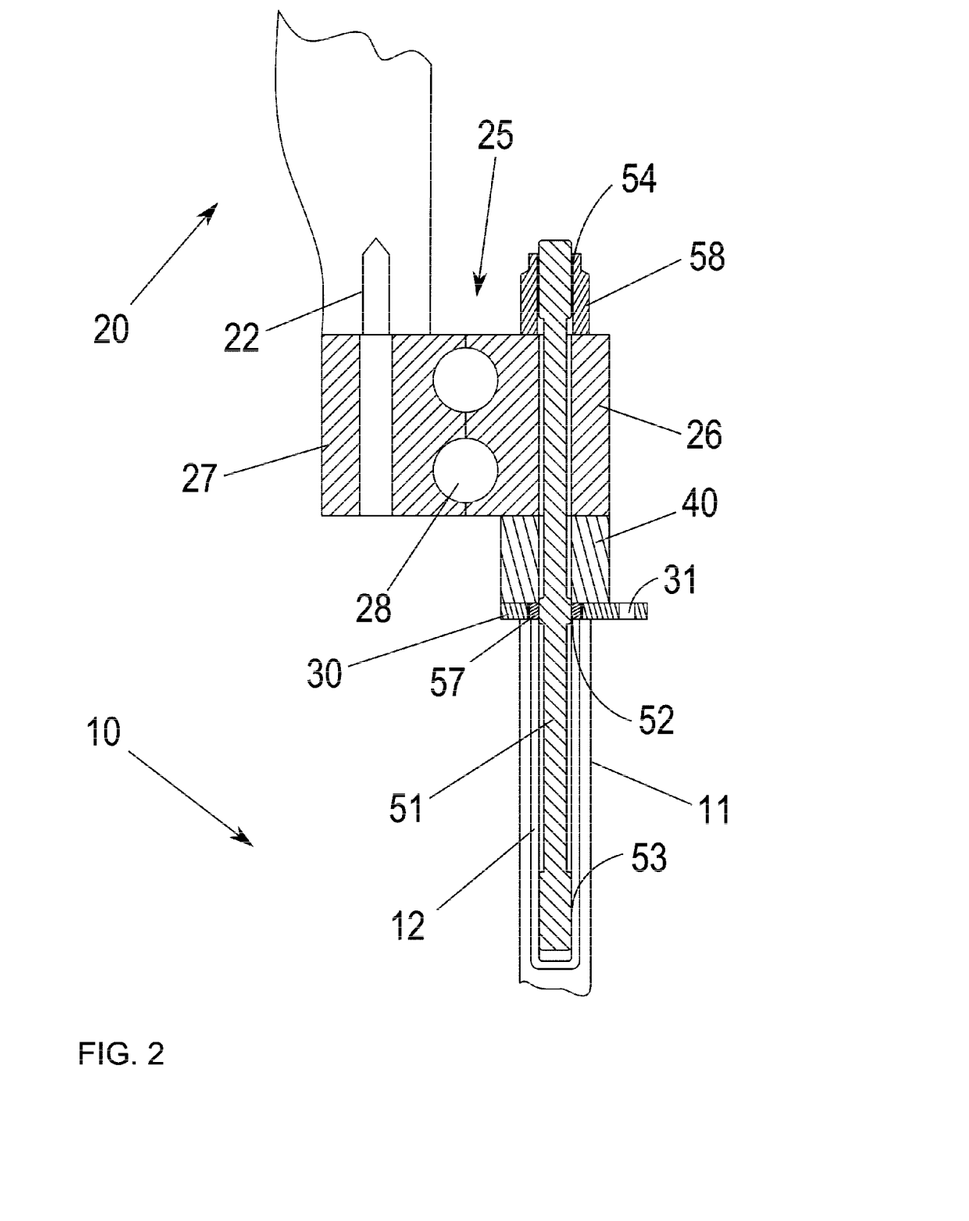
FIG. 2 is a sectional view of an attachment between the blade and the hub.

The blades in a wind turbine are typically made from composite materials, in which reinforcing fibres are bonded to one another with a resin and, subsequently, cured to consolidate. Such composite materials may not have the structural integrity to withstand the strains the blade root portion is subjected to. A strengthener or rigidizer may be provided in order to strengthen the blade root portion. In the embodiment of FIG. 2, the strengthener comprises two elements, a mounting flange 30 and a mounting ring 40.

The flange 30 is a metal piece, usually made of steel, that stabilizes and rigidizes the blade root portion 11. The flange 30 is arranged between the blade 10 and the hub 20 and is provided with holes that allow the stud bolts 50 or 51 to pass through the flange. Normal stud bolts 50 are provided with a screw thread 53 at one end and another screw thread 54 at the other end. The screw thread 53 is screwed into the insert 12 and the screw thread 54 is screwed into the nut 58 (actually, the nut 58 is screwed onto the screw thread 54 and against the bearing 25). The flange 30 is thus held between the bearing 25 and the blade root portion 11, when the blade 10 is mounted to the hub 20.

Special stud bolts 51 further comprise a central screw thread 52 located on the central region of the bolt. A nut 57 can cooperate with both the central screw thread 52 and the flange 30 to fasten the latter to the blade root portion 11 when the normal stud bolts 50 are not fastening the blade root portion 11 to the bearing 25 (and thus the flange 30 is not held between the bearing and the flange), for example because the nuts 58 corresponding to the normal stud bolts 50 are not screwed onto said bolts. When this is the case, the blade 10 can be supported, at least temporarily, through the flange 30 and the special bolts 51.

The flange 30 may be provided with some holes 31 to cooperate with hoisting means 90 (see FIG. 12) to hoist the blade through the flange. This allows the blade to be mounted to the hub or to be dismounted therefrom without the need of any special attachment, like a harness, between the hoisting means and the blade. In this way, no detrimental pressure needs to be applied to the blade surface.

Figure 3:
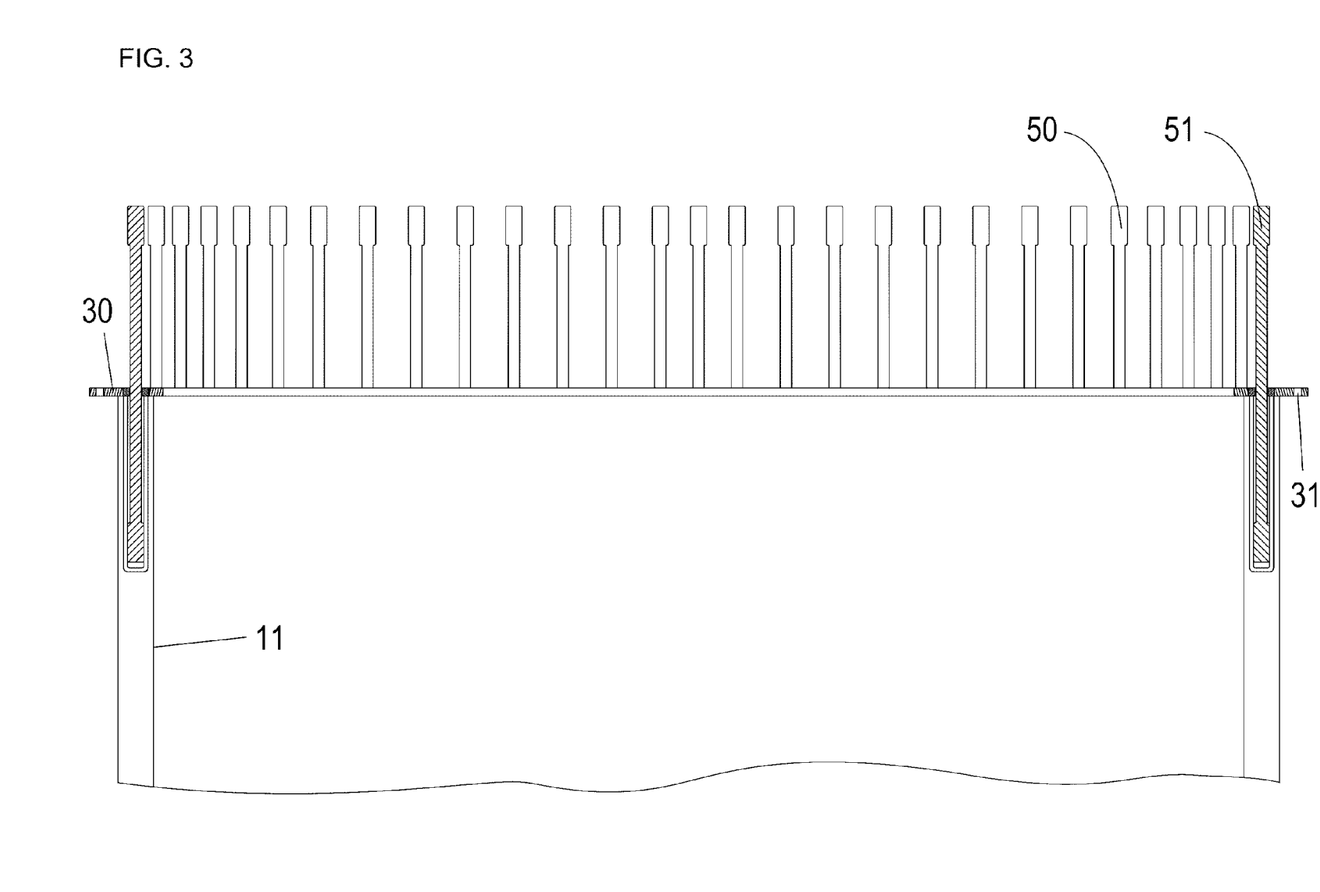
FIG. 3 is a sectional view of the root portion of a blade with some bolts for attachment to the hub.
Figure 4:
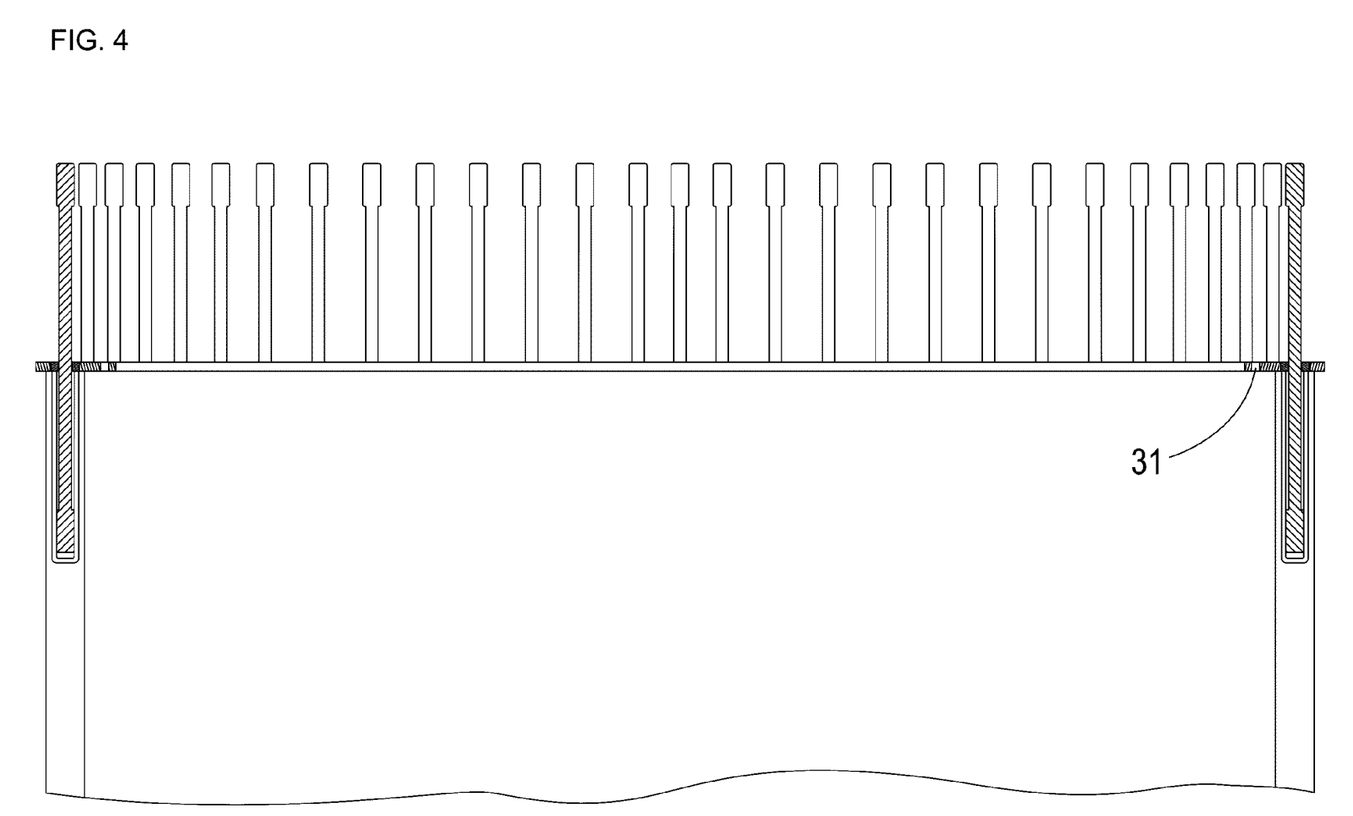
FIG. 4 is a sectional view of the root portion of a blade with some bolts for attachment to the hub.
Figure 10:
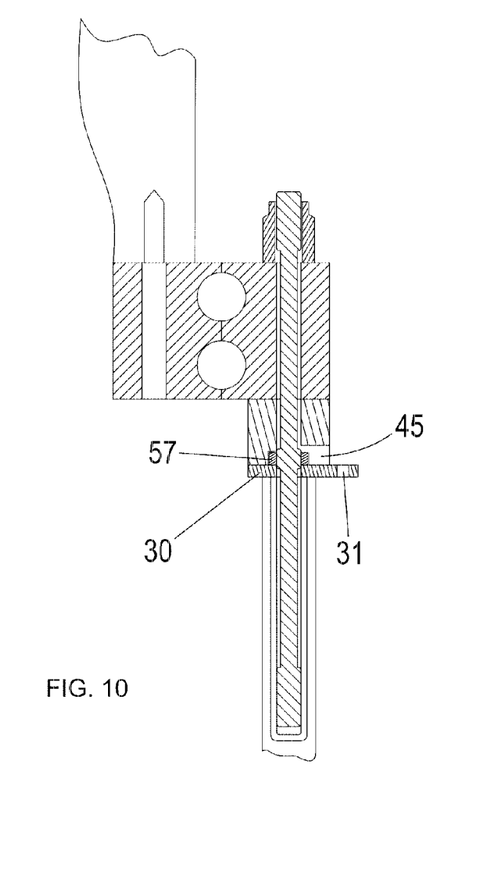
FIG. 10 is a sectional view of an attachment between the blade and the hub.
Figure 11:
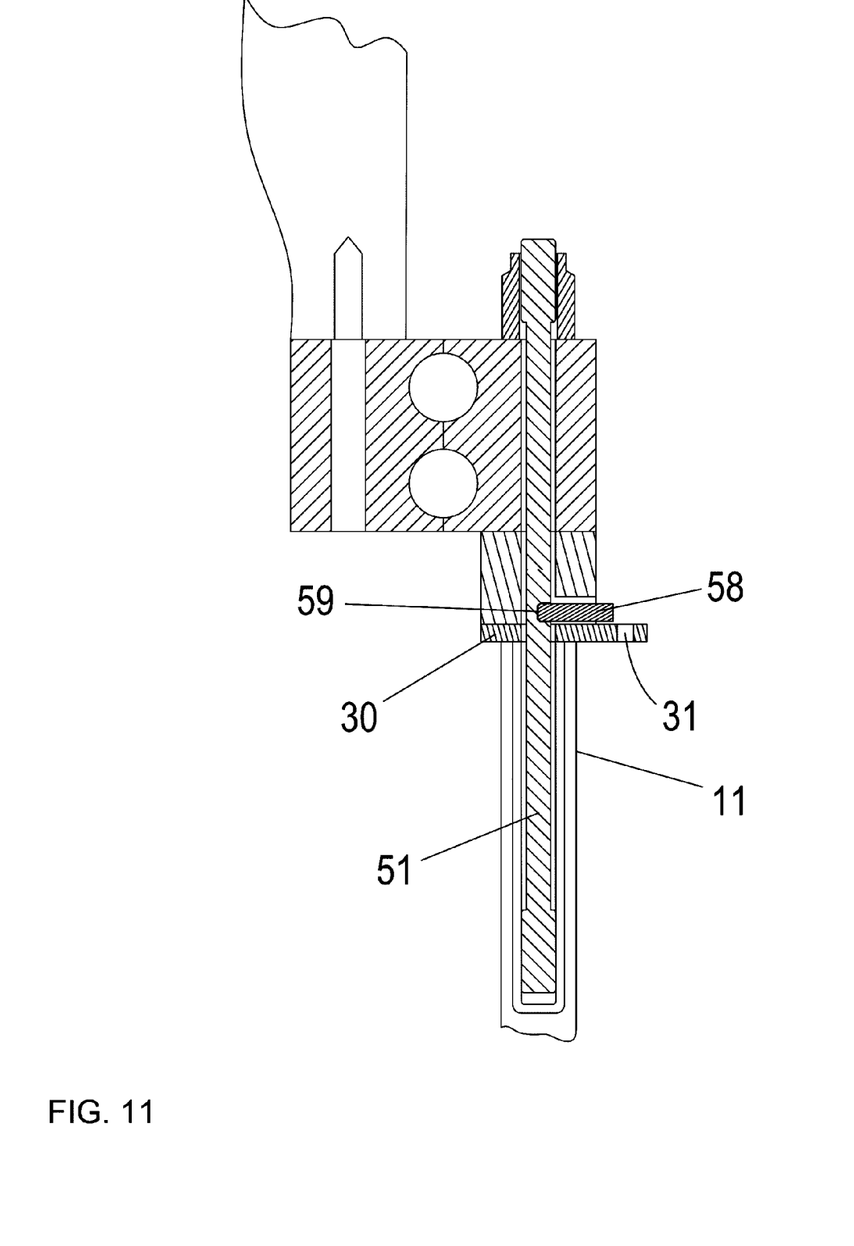
FIG. 11 is a sectional view of an attachment between the blade and the hub.
Figure 12:
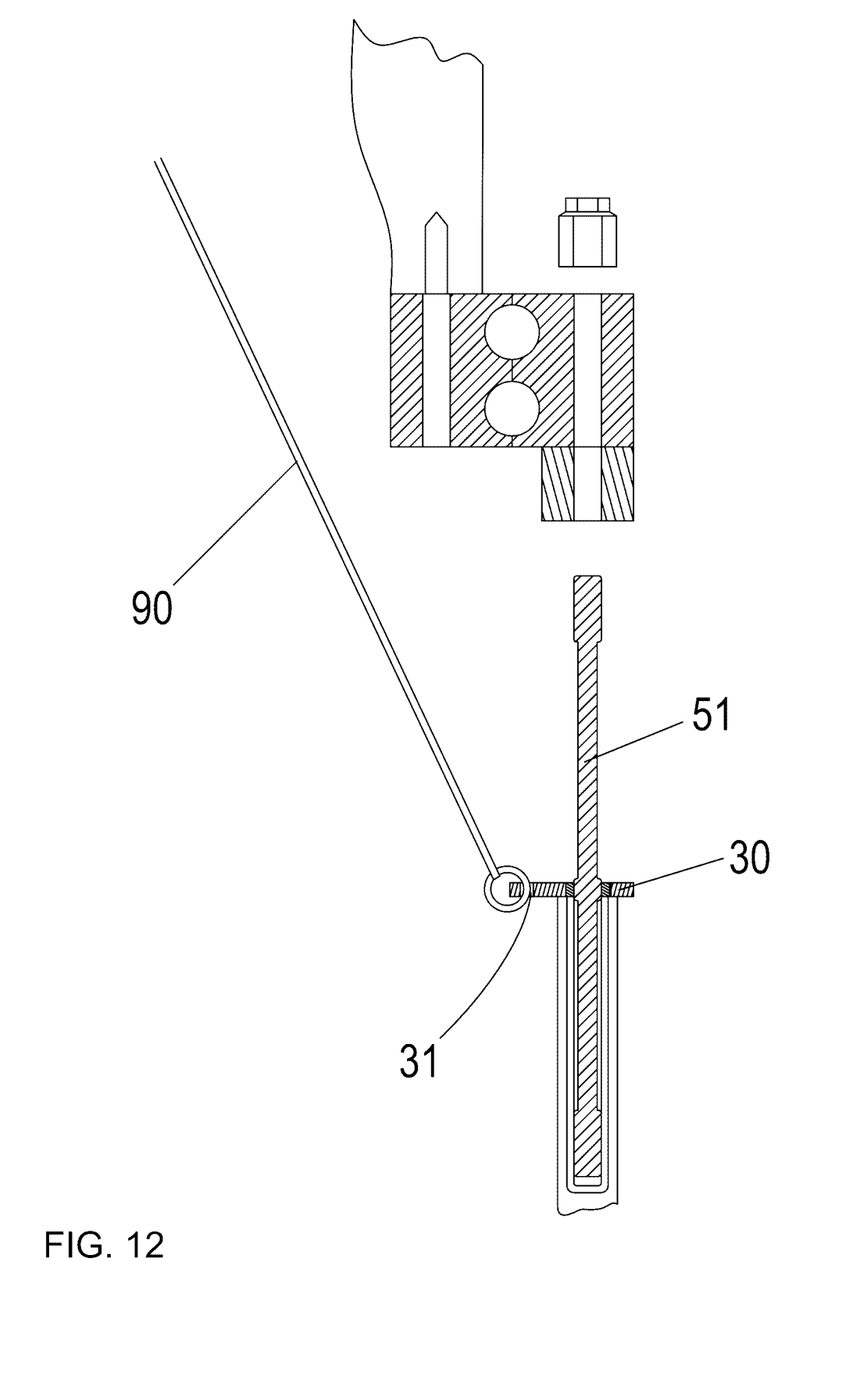
FIG. 12 is a schematic view of the process of attaching the blade to the hub.

In the embodiments of FIGS. 2, 4, 5, 6, 10 and 11, the holes 31 are provided at the inner region of the flange 30, i.e., inside the root of the blade, while in the embodiments of FIGS. 3 and 12, the holes 31 are provided at the outer region of the flange 30, i.e., outside the blade. The flange 30 may comprise some inner or outer lugs (not shown) that in turn comprise the holes 31. It will be readily understood that the holes 31 provide just one means to anchor the blade 10 to the hoisting means, and that other means can be easily devised, like for instance some pegs suitable to be attached to the hoisting means.

The ring 40 is a metal piece, usually made of steel, that is arranged between the flange 30 and the hub 20 and is provided with holes that allow the bolts 50 or 51 to pass through the ring. The ring 40 is thus held between the bearing 25 and the flange 30 when the blade 10 is mounted to the hub 20.

The following embodiments present some variants of the configuration shown in FIG. 2. In FIGS. 5-11 the same elements have the same reference number than in FIG. 2.

Figure 5:
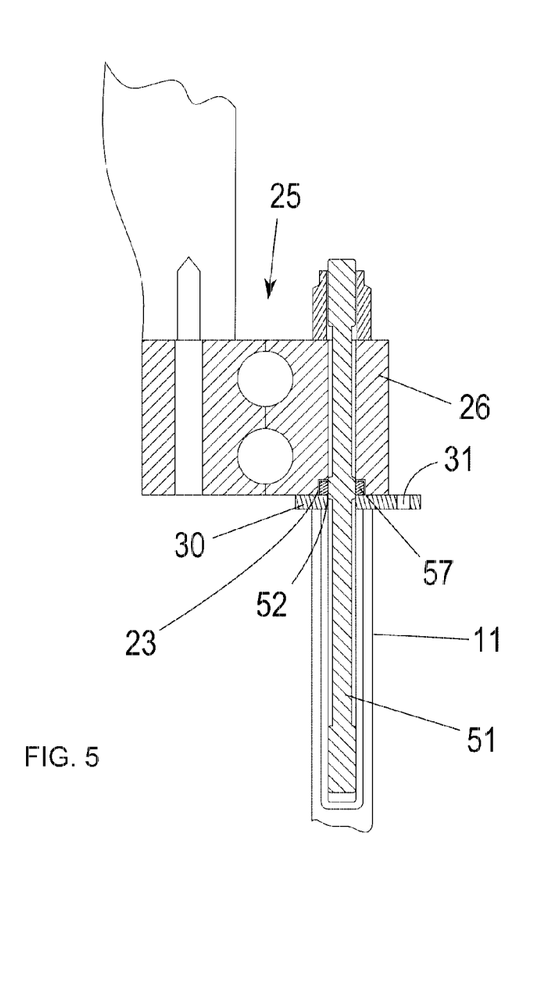
FIG. 5 is a sectional view of an attachment between the blade and the hub.

In the embodiment of FIG. 5 there is no ring 40 and the nuts 57 are housed in a plurality of cavities 23 provided on the rotary race 26 of the bearing 25. Each nut 57 can be screwed onto the central screw thread 52 of the corresponding special bolt 51 and against the flange 30, thus fastening the latter to the blade 10. Like with the embodiment of FIG. 2, the blade 10 can be hoisted through the flange 30.

Figure 6:
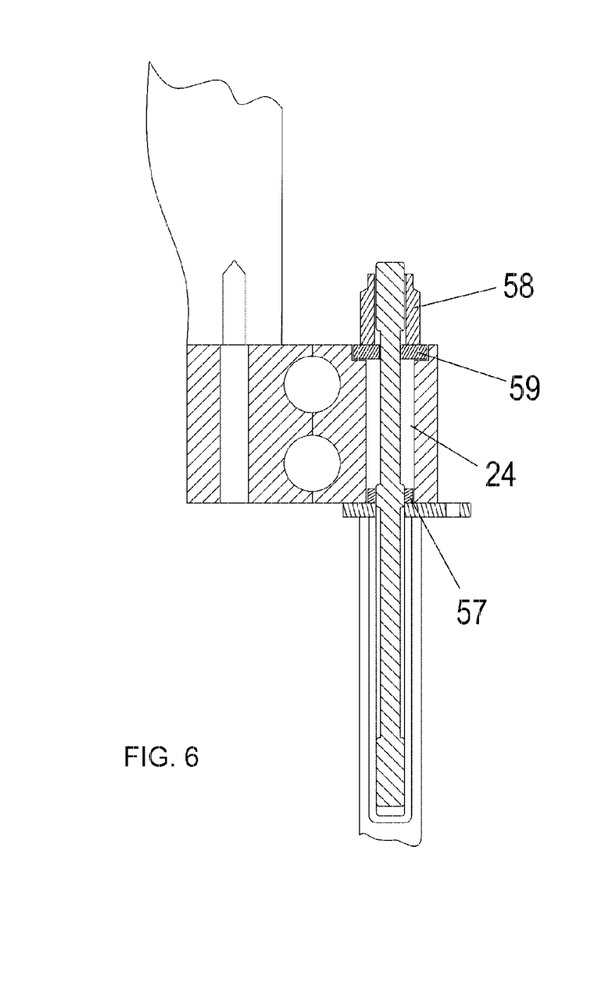
FIG. 6 is a sectional view of an attachment between the blade and the hub.

The embodiment of FIG. 6 is similar to the embodiment of FIG. 5, the main difference being that the cavity 23 of FIG. 5 has become a through hole 24 in FIG. 6. This allows the extraction of the nuts 57 and the substitution, if desired, of the special bolts 51 with normal bolts 50, once the rest of normal bolts 50 have been fastened.

The rotary race 26 comprises a plurality of upper cavities 29 to house corresponding washers 59. The upper cavities 29 are provided in correspondence with the through holes 24, so that the nuts 58 corresponding to the special bolts 51 can be fastened against said washers 59. Without the washers 59 the nuts 58 would be fastened against a narrow ring on the surface of the rotary race 26, because of the widened through holes 24, but the washers 59 provide a good seat for the nuts 58.

Figure 7:
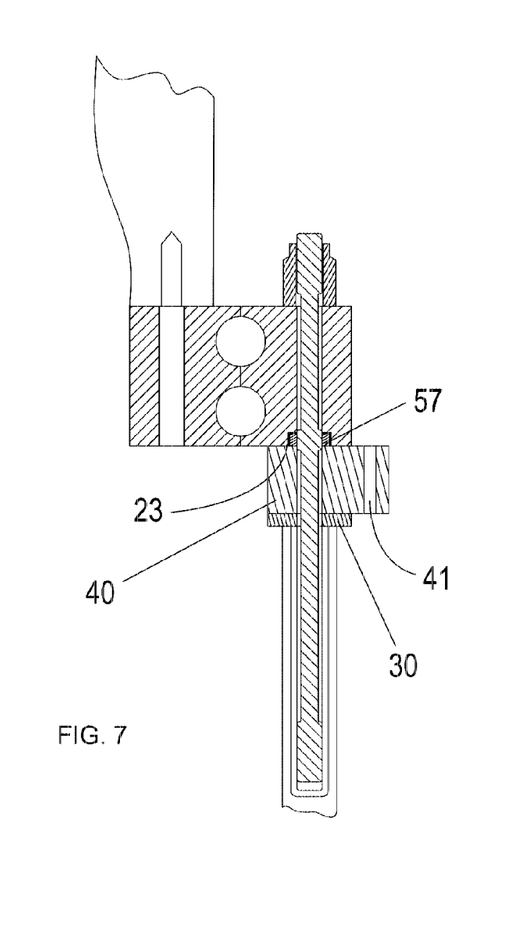
FIG. 7 is a sectional view of an attachment between the blade and the hub.
Figure 13:
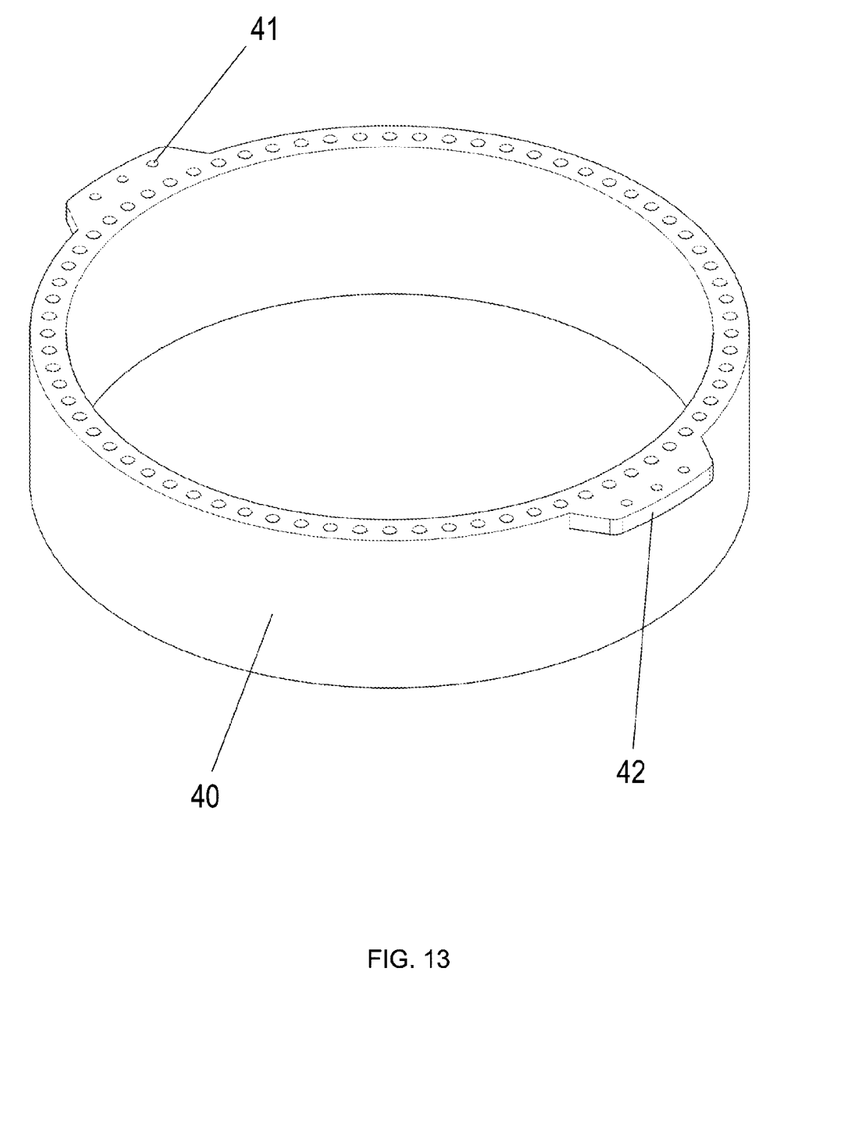
FIG. 13 is a perspective view of a mounting ring.

The embodiment of FIG. 7 is similar to the embodiment of FIG. 5, the differences being that a ring 40 is arranged between the bearing 25 and the flange 30, and that the ring 40 comprises a plurality of holes 41 analogous to the holes 31 in FIG. 5. Each nut 57 can be screwed onto the central screw thread 52 of the corresponding special bolt 51 and against the ring 40, thus fastening the latter to the blade 10. The holes 41 are intended to cooperate with hoisting means (not shown) to hoist the blade 10 through the ring 40. The ring 40 may comprise some inner or outer lugs 42 (see FIG. 13) that in turn comprise the holes 41. It will be readily understood that the holes 41 provide just one means to anchor the blade 10 to the hoisting means, and that other means can be easily devised, like for instance some pegs suitable to be attached to the hoisting means.

Figure 8:
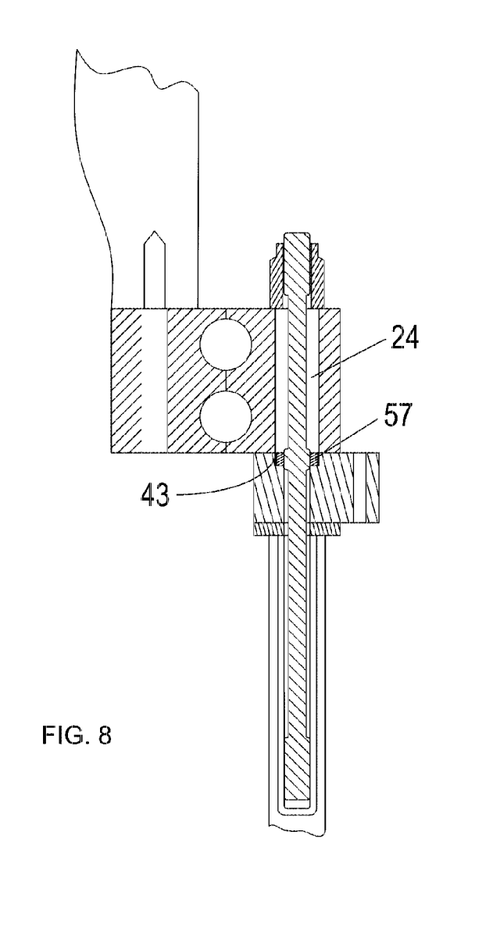
FIG. 8 is a sectional view of an attachment between the blade and the hub.

The embodiment of FIG. 8 is similar to the embodiment of FIG. 7, the differences being that the cavity 23 of FIG. 7 has become a through hole 24 in FIG. 8, and that the actual housing for the nuts 57 is a plurality of cavities 43 provided in the ring 40. As with the embodiment of FIG. 6, the hole 24 allows the extraction of the nuts 57 and the substitution, if desired, of the special bolts 51 with normal bolts 50, once the rest of normal bolts 50 have been fastened.

Figure 9:
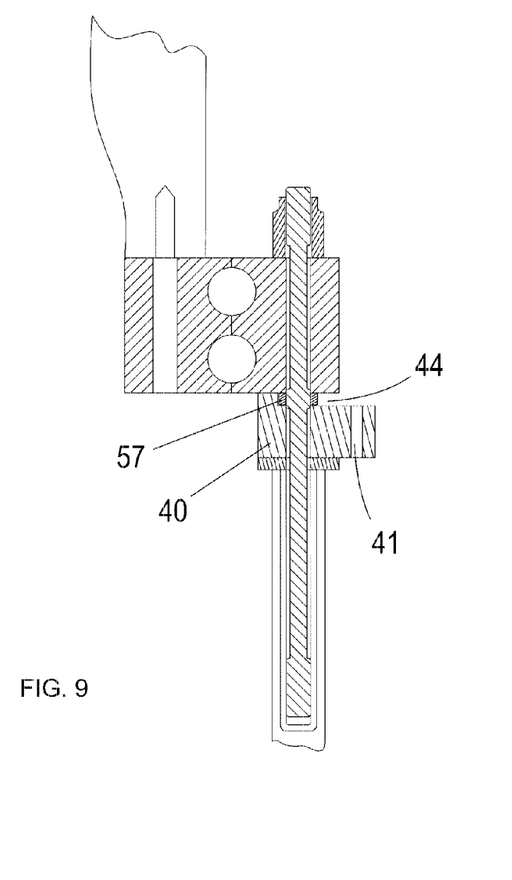
FIG. 9 is a sectional view of an attachment between the blade and the hub.

The embodiment of FIG. 9 is similar to the embodiment of FIG. 8, the differences being that the cavity 43 of FIG. 8 has become an upper radial recess 44 in FIG. 9, and that there is no widened hole 24 through which to extract the nut 57. The nuts 57 can nevertheless be accessed through the recesses 44 to be fastened or unfastened.

The embodiment of FIG. 10 is similar to the embodiment of FIG. 9, the difference being that the upper radial recess 44 of FIG. 9 has become a lower radial recess 45 in FIG. 10, with the consequence that the nuts 57 can be fastened against the flange 30 and therefore the blade 10 can be hoisted through the flange 30.

The embodiment of FIG. 11 is similar to the embodiment of FIG. 10, the difference being that the nut 57 of FIG. 10 has become a pin or holder 58 in FIG. 11. The pins 58 cooperate with corresponding indentations 59 provided in the central region of the special bolts 51 to attach the flange 30 to the blade root portion 11. Instead of pins, the holders 58 may for example be snap rings or the like.

The flange 30 and the ring 40 are variants of a generic supporting part that, among other things, contributes to strengthen the blade root portion 11 of the blade 10. When mounting the blade, said supporting part, in whatever form, is first attached to the blade root portion by means of the special bolts 51 and corresponding nuts 57 or holders 58, as explained above. Then the blade 10 is hoisted up through the supporting part and mounted onto the hub 20. For the sake of simplicity, the explanation that follows will refer only to the nuts 57, but it is also applicable to any holders 58.

Once the blade is fitted on the hub, a final torque is applied to both the normal bolts 50 and the special bolts 51. The bolts undergo a small elongation and the nuts 57 are moved off the supporting part and cease to be engaged thereto. At this point, the special bolts 51 behave just like the normal bolts 50. If desired, the special bolts 50 can then be replaced by normal bolts 50.

When dismounting the blade, the supporting part is first anchored to the hoisting means. The normal bolts 50 are then unfastened and the blade is supported by the hoisting means through the supporting part by virtue of the special bolts 51 and the nuts 57, which are again engaged to the supporting part. Then the blade is hoisted down to the ground (or to the sea, in the case of an offshore wind turbine).

The present disclosure offers, among others, the following advantages:
- the handling of the blade is not by friction;
- the blade root portion is not deformed;
- the blade can be dismounted in the same way it is mounted;
- the normal bolts fit easily;
- the rotor assembly can be anchored, for whatever reason, through the supporting parts of the blades.

Although only particular embodiments of the invention have been shown and described in the present specification, the skilled man will be able to introduce modifications and substitute any technical features thereof with others that are technically equivalent, depending on the particular requirements of each case, without departing from the scope of protection defined by the appended claims.

For example, there may be any suitable number of special bolts 51. There might even be no normal bolts 50, in which case all the fastening bolts would be special bolts 51 provided with the central screw thread 52 or the indentation 59. This does not imply that all said central screw threads or indentations should be used; there might be bolts 51 to which no nut 57 is threaded, in which case these bolts would act as normal bolts 50.

Or, for example, there may be one or more additional elements arranged between the blade and the hub which can be attached to the blade, so that the latter can be hoisted through any such additional element.

The invention claimed is:

1. A rotor assembly for a wind turbine, comprising:
a hub,
a blade provided with a blade root portion, and
a ring-shaped strengthener component that is fixed to and completely encircles the blade root portion, the strengthener component further comprising a radially inwardly or radially outwardly disposed support section configured for attachment to a hoisting mechanism,
a plurality of first fasteners extending through holes in the strengthener component and configured to fasten the blade root portion to the hub in operation of the wind turbine, and
a plurality of second fasteners extending through holes in the strengthener component, the strengthener component fixed to the blade root portion by the second fasteners during operation of the wind turbine and when the blade is removed from the hub, the plurality of second fasteners also configured to fasten the blade root portion to the hub in operation of the wind turbine.

2. The rotor assembly of claim 1, comprising means for engaging the second fasteners at a central region of the second fasteners to fasten the strengthener component to the blade root portion.

3. A method for mounting a blade to the rotor assembly of claim 1, comprising the steps of:
fastening the strengthener component to the blade root portion with the second fasteners and means for engaging the second fasteners at a central region thereof to fasten the strengthener component to the blade root portion;
attaching the support section of the strengthener component to a hoisting means;
hoisting up the blade to the hub;
fastening the blade root portion to the hub with the first fasteners; and
fastening the blade root portion to the hub by means of the second fasteners.

4. The method of claim 3, comprising the steps of replacing some of the second fasteners with first fasteners and further fastening the blade root portion to the hub with these first fasteners.

5. A method for dismounting a blade from the rotor assembly of claim 1, comprising the steps of:
attaching the support section of the strengthener component to a hoisting means;
partially unfastening the blade root portion from the hub by removing the first fasteners but keeping the second fasteners attached to the blade root portion;
hoisting down the blade.

6. A method for dismounting a blade from the rotor assembly of claim 1, comprising the steps of:
attaching the support section of the strengthener component to a hoisting means;
partially unfastening the blade root portion from the hub by removing the first fasteners but keeping the second fasteners attached to the blade root portion;
hoisting down the blade; and
further comprising replacing some first fasteners with second fasteners prior to attaching the support section to the hoisting means.

7. A rotor assembly for a wind turbine, comprising:
a hub,
a blade provided with a blade root portion, and
a ring-shaped strengthener component that is fixed to and completely encircles the blade root portion, the strengthener component further comprising a radially inwardly or radially outwardly disposed support section configured for attachment to a hoisting mechanism,
a plurality of first fasteners extending through holes in the strengthener component and configured to fasten the blade root portion to the hub in operation of the wind turbine, and a plurality of second fasteners extending through holes in the strengthener component, the strengthener component fixed to the blade root portion by the second fasteners during operation of the wind turbine and when the blade is removed from the hub,
comprising meaning for engaging the second fasteners at a central region of the second fasteners to fasten the strengthener component to the blade root portion, and
wherein the second fasteners are bolts, each of which being provided with an indentation or screw thread at the central region of the bolt, wherein the means for engaging the second fasteners comprises a plurality of nuts or holders that engage with the screw threads or indentations.

8. The rotor assembly of claim 7, wherein the bolts are provided with the screw thread at the central region of the bolt, and the means for engaging the second fasteners comprises a plurality of nuts that engage with the screw threads.

9. The rotor assembly of claim 7, wherein the strengthener component comprises a mounting flange for attachment to the blade root portion, the plurality of nuts or holders seated in the mounting flange.

10. The rotor assembley of claim 7,
wherein the strengthener component comprises a mounting flange against the blade root portion and further comprises a mounting ring between the mounting flange and the hub, the mounting ring comprising a plurality of recesses or cavities to house the plurality of holders.

11. The rotor assembly of claim 10, wherein the recesses are radial recesses opened to the inside of the mounting ring.

12. The rotor assembly of claim 7, wherein the hub comprises a bearing for the blade, the plurality of nuts or holders seated in the bearing.

13. The rotor assembly of claim 12, wherein the means for engaging the second fasteners are nuts disposed in a through hole defined in the bearing.

* * * * *